US011082107B2

(12) United States Patent
Tsai et al.

(10) Patent No.: US 11,082,107 B2
(45) Date of Patent: Aug. 3, 2021

(54) FREQUENCY-SELECTIVE PRECODING FOR UPLINK TRANSMISSIONS IN MOBILE COMMUNICATIONS

(71) Applicant: MediaTek Inc., Hsinchu (TW)

(72) Inventors: Lung-Sheng Tsai, Hsinchu (TW); Chiao-Yao Chuang, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 16/295,905

(22) Filed: Mar. 7, 2019

(65) Prior Publication Data

US 2019/0280751 A1    Sep. 12, 2019

Related U.S. Application Data

(60) Provisional application No. 62/640,692, filed on Mar. 9, 2018.

(51) Int. Cl.
*H04B 7/06*    (2006.01)
*H04L 25/02*    (2006.01)
(Continued)

(52) U.S. Cl.
CPC ......... *H04B 7/0626* (2013.01); *H04B 7/0456* (2013.01); *H04B 7/0639* (2013.01);
(Continued)

(58) Field of Classification Search
CPC ... H04B 7/0456; H04B 7/0639; H04B 7/0626
See application file for complete search history.

(56) References Cited

U.S. PATENT DOCUMENTS

2015/0223161 A1    8/2015  Xiao et al.
2016/0211895 A1*   7/2016  Onggosanusi ....... H04B 7/0404
(Continued)

FOREIGN PATENT DOCUMENTS

WO    WO 2011150549 A1   12/2011
WO    WO 2014082266 A1    6/2014
WO    WO 2018228478 A1   12/2018

OTHER PUBLICATIONS

China National Intellectual Property Administration, International Search Report and Written Opinion for International Patent Application No. PCT/CN2019/077525, dated May 6, 2019.
(Continued)

*Primary Examiner* — Shukri Taha
(74) *Attorney, Agent, or Firm* — Andy M. Han; Han IP PLLC (57) ABSTRACT

Various examples with respect to frequency-selective precoding for uplink (UL) transmissions in mobile communications are described. A processor of a user equipment (UE) receives signaling from a network node of a wireless network. The processor then performs a codebook-based UL transmission to the network node with frequency-selective precoding in a subband of a plurality of subbands according to the signaling received from the network. For non-codebook-based UL transmissions, the processor performs a non-codebook-based UL transmission of a beamformed sounding reference signal (SRS) to the network node by determining a precoder and performing frequency-selective precoding on the SRS using the precoder with a size of precoder bundling for the frequency-selective precoding in a frequency domain known by the network node.

16 Claims, 5 Drawing Sheets

(51) Int. Cl.
*H04B 7/0456* (2017.01)
*H04L 5/00* (2006.01)
*H04B 7/0404* (2017.01)

(52) U.S. Cl.
CPC ........ *H04L 5/0051* (2013.01); *H04L 25/0226* (2013.01); *H04B 7/0404* (2013.01)

(56) References Cited

U.S. PATENT DOCUMENTS

2017/0070273 A1   3/2017  Lee et al.
2020/0146035 A1*  5/2020  Kim .................... H04L 5/0092

OTHER PUBLICATIONS

3GPP, Technical Specification Group Radio Access Network; Study on New Radio (NR) Access Technology (Release 14), TR 38.912 v1.0.0, Mar. 2017.
Taiwan Intellectual Property Office, Office Action for Taiwan Patent Application No. 109102958, dated Dec. 29, 2020.

* cited by examiner

RECEIVE, BY A PROCESSOR OF A USER EQUIPMENT (UE), SIGNALING FROM A NETWORK NODE OF A WIRELESS NETWORK
410

PERFORM, BY THE PROCESSOR, A CODEBOOK-BASED UPLINK (UL) TRANSMISSION TO THE NETWORK NODE WITH FREQUENCY-SELECTIVE PRECODING IN A SUBBAND OR A PLURALITY OF SUBBANDS ACCORDING TO THE SIGNALING RECEIVED FROM THE NETWORK
420

```
┌─────────────────────────────────────────────────┐
│ MEASURE, BY A PROCESSOR OF A USER EQUIPMENT (UE), A CHANNEL │
│ STATE INFORMATION REFERENCE SIGNAL (CSI-RS) TRANSMITTED BY A │
│ NETWORK NODE OF A WIRELESS NETWORK              │
│ 510                                             │
└─────────────────────────────────────────────────┘
                        │
                        ▼
┌─────────────────────────────────────────────────┐
│ PERFORM, BY THE PROCESSOR, A NON-CODEBOOK-BASED UPLINK (UL) │
│ TRANSMISSION WITH A BEAMFORMED SOUNDING REFERENCE SIGNAL (SRS) │
│ TO THE NETWORK NODE                             │
│ 520                                             │
│   ┌─────────────────────────────────────────┐   │
│   │ DETERMINE A PRECODER BASED ON A RESULT OF THE │   │
│   │ MEASURING                               │   │
│   │ 522                                     │   │
│   └─────────────────────────────────────────┘   │
│                    │                            │
│                    ▼                            │
│   ┌─────────────────────────────────────────┐   │
│   │ PERFORM FREQUENCY-SELECTIVE PRECODING ON THE SRS │   │
│   │ USING THE PRECODER WITH A SIZE OF PRECODER BUNDLING FOR │   │
│   │ THE FREQUENCY-SELECTIVE PRECODING IN A FREQUENCY DOMAIN │   │
│   │ KNOWN BY THE NETWORK NODE               │   │
│   │ 524                                     │   │
│   └─────────────────────────────────────────┘   │
└─────────────────────────────────────────────────┘
```

FIG. 5

FREQUENCY-SELECTIVE PRECODING FOR UPLINK TRANSMISSIONS IN MOBILE COMMUNICATIONS

CROSS REFERENCE TO RELATED PATENT APPLICATION(S)

The present disclosure is part of a non-provisional application claiming the priority benefit of U.S. Patent Application Nos. 62/640,692, filed 9 Mar. 2018, the content of which is incorporated by reference in its entirety.

TECHNICAL FIELD

The present disclosure is generally related to mobile communications and, more particularly, to frequency-selective precoding for uplink (UL) transmissions in mobile communications.

BACKGROUND

Unless otherwise indicated herein, approaches described in this section are not prior art to the claims listed below and are not admitted as prior art by inclusion in this section.

Under current $3^{rd}$-Generation Partnership Project (3GPP) specifications for Long-Term Evolution (LTE) and $5^{th}$-Generation (5G) New Radio (NR), wideband-based transmission precoder matrix indication (TPMI) is signaled to a user equipment (UE) by a network. Frequency-selective precoding is not yet supported for codebook-based UL transmissions. To support frequency-selective precoding, the network would need to indicate which precoder is to be used for each subband of frequency, or each group of physical resource blocks (PRBs), where the group size should be defined. However, doing so would increase the size of overhead compared to that of legacy signaling for wideband TPMI.

Moreover, in non-codebook-based UL transmissions, a precoded sounding reference signal (SRS) is transmitted by the UE to the network. The precoder to be applied on the SRS is derived from measurement of downlink (DL) channel state information reference signal (CSI-RS) transmitted by the network, assuming channel reciprocity holds so that UL channel information can be estimated or otherwise approximately obtained. However, although frequency-selective precoding on SRS is allowed in NR, there is no limitation on precoder bundling size in the frequency domain. Without the limitation on the precoder bundling size, it could be difficult for the network to design a filter for channel estimation based on SRS measurement, since the network cannot assume channel response is continuous across one PRB or multiple PRBs.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose schemes, solutions, concepts, designs, methods and apparatuses pertaining to frequency-selective precoding for UL transmissions in mobile communications. That is, various propose schemes, solutions, concepts, designs, methods and apparatuses proposed in the present disclosure are intended to address aforementioned issues.

In one aspect, a method may involve a processor of a UE receiving signaling from a network node of a wireless network. The method may also involve the processor performing a codebook-based UL transmission to the network node with frequency-selective precoding in a subband or a plurality of subbands according to the signaling received from the network.

In one aspect, a method may involve a processor of a UE measuring a CSI-RS transmitted by a network node of a wireless network. The method may also involve the processor performing a non-codebook-based UL transmission of a beamformed SRS to the network node by: (a) determining a precoder based on a result of the measuring; and (b) performing frequency-selective precoding on the SRS using the precoder with a size of precoder bundling for the frequency-selective precoding in a frequency domain known by the network node.

In one aspect, an apparatus implementable in a UE may include a processor which, when in operation, performs a plurality of operations including: (a) performing a codebook-based UL transmission to a network node of a wireless network with frequency-selective precoding; or (b) performing a non-codebook-based UL transmission to the network node with frequency-selective precoding. A size of precoder bundling for the frequency-selective precoding in a frequency domain in the codebook-based UL transmission or the non-codebook-based UL transmission may be known by the network node and the UE.

It is noteworthy that, although description provided herein may be in the context of certain radio access technologies, networks and network topologies such as 5G/NR mobile communications, the proposed concepts, schemes and any variation(s)/derivative(s) thereof may be implemented in, for and by other types of radio access technologies, networks and network topologies wherever applicable such as, for example and without limitation, LTE, LTE-Advanced, LTE-Advanced Pro, Internet-of-Things (IoT) and Narrow Band Internet of Things (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Figure 1:
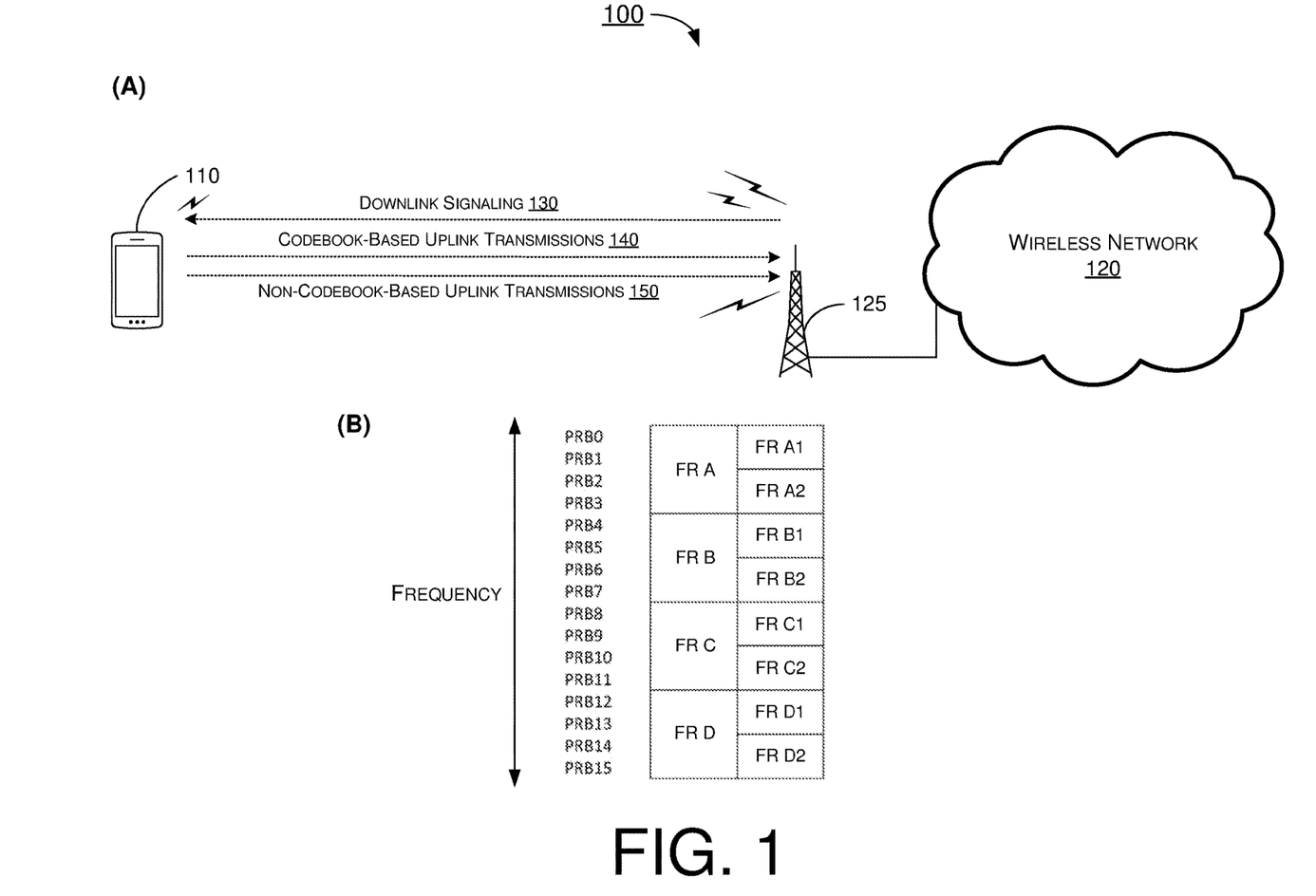
FIG. 1 is a diagram of an example scenario in which various proposed schemes in accordance with the present disclosure may be implemented.

FIG. 1 illustrates an example scenario 100 in which various proposed schemes in accordance with the present disclosure may be implemented. Referring to part (A) of FIG. 1, scenario 100 may involve a UE 110 (e.g., a smartphone, a computing device or an IoT device) and a wireless network 120 (e.g., a 5G NR mobile network) with network 120 in wireless communication with UE 110 via a network node 125 (e.g., a gNB or transmit/receive point (TRP)). In scenario 100, network node 125 may transmit data, general information and control information via DL signaling 130. Additionally, UE 110 may perform codebook-based UL transmissions 140 or non-codebook-based UL transmissions 150 to network node 125 by implementing one or more proposed schemes in accordance with the present disclosure as described below.

Under a proposed scheme in accordance with the present disclosure with respect to frequency-selective precoding for codebook-based UL transmissions 140, a subband may be defined as a grouping or bundling of adjacent or otherwise contiguous PRBs on which the same precoder is applied. Under the proposed scheme, the size of subband, which is also the size of precoder bundling, may be signaled from network 120 to UE 110 via network node 125 via DL signaling 130. For instance, a subband TPMI may be signaled from network 120 to UE 110 to support frequency-selective precoding for UL transmissions. The subband TPMI corresponding to subband #i may be signaled in a differential way such as, for example and without limitation, for subband #i, subband TPMI=wideband TPMI+$\Delta_i$, with $\Delta_i$ being an offset index to be signaled for subband #i, and the value range of $\Delta_i$ is limited so that the signaling overhead of A, is small compared to wideband TPMI overhead. That is, each index corresponding to subband TPMI=wideband TPMI+$\Delta_i$ may be a respective vector or precoder of a plurality of vectors or precoders.

Referring to part (B) of FIG. 1, in one illustrative example, every four adjacent/contiguous PRBs may be grouped or otherwise bundled together as a subband. For example, PRB0~PRB3 across a frequency range A (labeled as "FR A" in FIG. 1) may correspond to a first subband, PRB4~PRB7 across a frequency range B (labeled as "FR B" in FIG. 1) may correspond to a second subband, PRB8~PRB11 across a frequency range C (labeled as "FR C" in FIG. 1) may correspond to a third subband, and PRB12~PRB15 across a frequency range D (labeled as "FR D" in FIG. 1) may correspond to a fourth subband. Accordingly, in frequency-selective precoding, a first precoder may be applied for signals within the first subband, a second precoder may be applied for signals within the second subband, a third precoder may be applied for signals within the third subband, and a fourth precoder may be applied for signals within the fourth subband.

Also referring to part (B) of FIG. 1, in another illustrative example, every two adjacent/contiguous PRBs may be grouped or otherwise bundled together as a subband. For example, PRB0~PRB1 across a frequency range A1 (labeled as "FR A1" in FIG. 1) may correspond to a first subband, PRB2~PRB3 across a frequency range A2 (labeled as "FR A2" in FIG. 1) may correspond to a second subband, PRB4~PRB5 across a frequency range B1 (labeled as "FR B1" in FIG. 1) may correspond to a third subband, PRB6~PRB7 across a frequency range B2 (labeled as "FR B2" in FIG. 1) may correspond to a fourth subband, PRB8~PRB9 across a frequency range C1 (labeled as "FR C1" in FIG. 1) may correspond to a fifth subband, PRB10~PRB11 across a frequency range C2 (labeled as "FR C2" in FIG. 1) may correspond to a sixth subband, PRB12~PRB13 across a frequency range D1 (labeled as "FR D1" in FIG. 1) may correspond to a seventh subband, and PRB14~PRB15 across a frequency range D2 (labeled as "FR D2" in FIG. 1) may correspond to an eighth subband. Accordingly, in frequency-selective precoding, signal(s) in an i-th subband may be precoded by an i-th precoder. For instance, signal(s) in the first subband may be precoded by a first precoder, signal(s) in the second subband may be precoded by a second precoder, signal(s) in the third subband may be precoded by a third precoder, signal(s) in the fourth subband may be precoded by a fourth precoder, signal(s) in the fifth subband may be precoded by a fifth precoder, signal(s) in the sixth subband may be precoded by a sixth precoder, signal(s) in the seventh subband may be precoded by a seventh precoder, and signal(s) in the eighth subband may be precoded by a eighth precoder.

Figure 2:
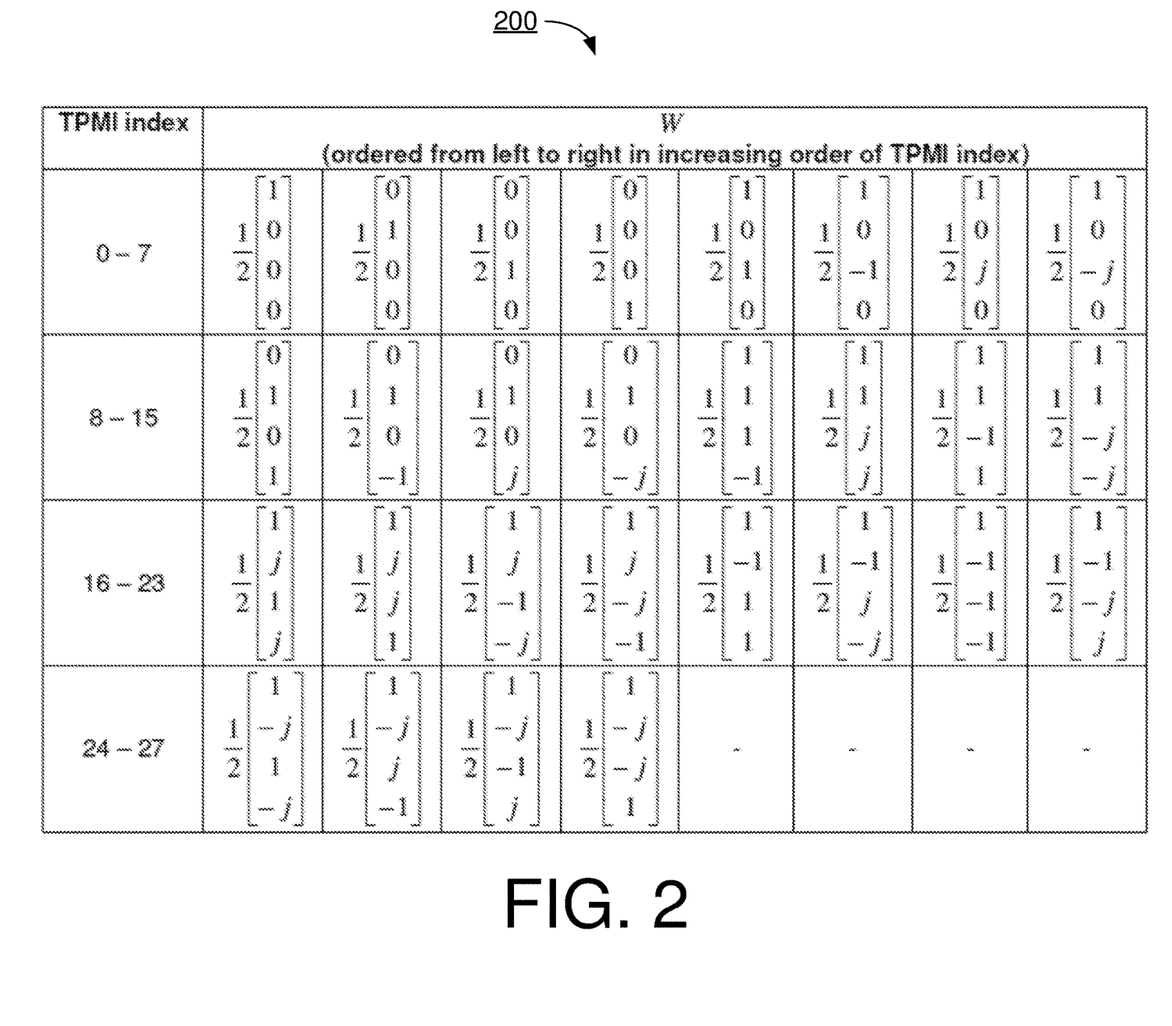
FIG. 2 is a diagram of an example differential signaling of subband TPMI in accordance with an implementation of the present disclosure.

FIG. 2 illustrates an example table 200 of mapping between TPMI indices and precoders for differential signaling of subband TPMI in accordance with an implementation of the present disclosure. Under a proposed scheme in accordance with the present disclosure, each subband TPMI may correspond to a respective precoder of a plurality of example precoders shown in table 200. For example, when wideband TPMI=16, TPMI for subband #i=16+$\Delta_i$, with $\Delta_i$ being signaled from network node 125 to UE 110 and i=0, 1, 2, . . . and so on. Table 200 may define a precoding matrix W for single-layer transmission using four antenna ports. Table 200 is for illustrative purposes only and, thus, the scope of the present disclosure is not limited thereto.

Under the proposed scheme, the value of $\Delta_i$ may be limited to a range smaller than the total number of allowable TPMI values. For example, $\Delta_i$ may be limited to a range between −3 and 4. It is noteworthy that the allowable precoders may correspond to a subset of all TPMI values. For example, for a UE that can only support partial-coherent transmissions, only the precoders with no more than two non-zero elements for each column vector may valid. In such cases, differential signaling of TPMI, as expressed by subband #i=wideband TPMI+$\Delta_i$, may be defined by only considering the valid precoders and skip those indices corresponding to invalid precoders.

Under the proposed scheme, network 120 may transmit, via network node 125, an indication to UE 110 for either permutation of a predefined mapping between TPMI indices and precoders or selecting one mapping from a plurality of predefined mappings between TPMI indices and precoders so that the precoders may vary smoothly as the index keeps increasing. For example, referring to table 200, network 120 may indicate to UE 110 that the column vectors corresponding to TPMI=26 and TPMI=27 may be swapped, so that UE 110 may interpret TPMI=26 as the precoder $$\frac{1}{2}\begin{bmatrix} 1 \\ -j \\ -j \\ 1 \end{bmatrix}$$

instead of $$\frac{1}{2}\begin{bmatrix} 1 \\ -j \\ -1 \\ j \end{bmatrix}.$$

Under a proposed scheme in accordance with the present disclosure with respect to frequency-selective precoding for non-codebook-based UL transmissions 150, considering the nature of channel reciprocity, the precoder on SRS in each PRB/subband may vary for frequency-selective precoding on beamformed SRS. That is, precoding bundling assumption, which implies that the number of contiguous PRBs using the same precoder, on beamformed SRS should be known by both UE 110 and network 120. Under the proposed scheme, such precoding bundling assumption may be predefined, signaled by network 120 to UE 110, or determined by UE 110 and reported to network 120.

Turning back to part (B) of FIG. 1, for non-codebook-based UL transmissions 150, UE 110 may transmit SRS to network node 125 using frequency-selective precoding (e.g., precoding two PRBs or four PRBs with the same precoder) for network node 125 to measure the SRS. In this example, both UE 110 and network 120 would need to know the boundary for grouping or bundling of PRBs for precoding (e.g., precoding in two PRBs such as PRB4 and PRB5 with a precoder corresponding to frequency range B1, or precoding in four PRBs such as PRB4 PRB7 with a precoder corresponding to frequency range B). This information (herein referred to as "precoding bundling assumption") may be predefined (e.g., both UE 110 and network 120 are pre-programmed accordingly), signaled by network 120 to UE 110, or determined by UE 110 and reported to network 120. Moreover, in cases that precoding bundling assumption is predefined or signaled from network 120 to UE 110, UE 110 may optionally modify the size of precoder bundling and report the modified size of precoder bundling to network 120.

Illustrative Implementations

Figure 3:
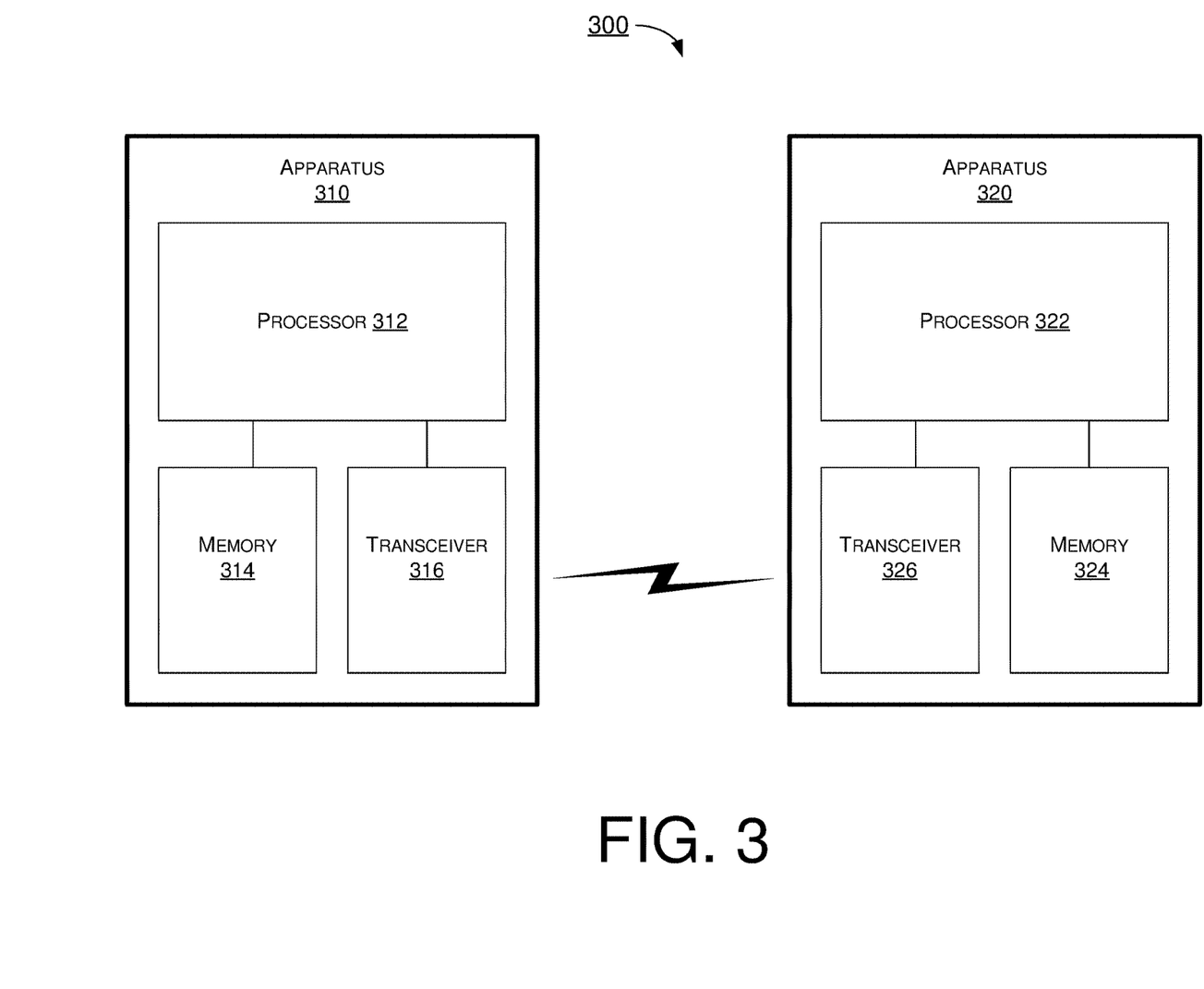
FIG. 3 is a diagram of an example wireless communication system in accordance with an implementation of the present disclosure.

FIG. 3 illustrates an example wireless communication system 300 in accordance with an implementation of the present disclosure. Wireless communication system 300 may involve an apparatus 310 and an apparatus 320 wirelessly connected to each other. Each of apparatus 310 and apparatus 320 may perform various functions to implement procedures, schemes, techniques, processes and methods described herein pertaining to frequency-selective precoding for UL transmissions in mobile communications, including the various procedures, scenarios, schemes, solutions, concepts and techniques described above as well as process 300 described below.

Each of apparatus 310 and apparatus 320 may be a part of an electronic apparatus, which may be a UE such as a portable or mobile apparatus, a wearable apparatus, a wireless communication apparatus or a computing apparatus. For instance, each of apparatus 310 and apparatus 320 may be implemented in a smartphone, a smartwatch, a personal digital assistant, a digital camera, or a computing equipment such as a tablet computer, a laptop computer or a notebook computer. Moreover, each of apparatus 310 and apparatus 320 may also be a part of a machine type apparatus, which may be an IoT or NB-IoT apparatus such as an immobile or a stationary apparatus, a home apparatus, a wire communication apparatus or a computing apparatus. For instance, each of apparatus 310 and apparatus 320 may be implemented in a smart thermostat, a smart fridge, a smart door lock, a wireless speaker or a home control center. Alternatively, each of apparatus 310 and apparatus 320 may be implemented in the form of one or more integrated-circuit (IC) chips such as, for example and without limitation, one or more single-core processors, one or more multi-core processors, one or more reduced-instruction-set-computing (RISC) processors or one or more complex-instruction-set-computing (CISC) processors.

Each of apparatus 310 and apparatus 320 may include at least some of those components shown in FIG. 3 such as a processor 312 and a processor 322, respectively. Each of apparatus 310 and apparatus 320 may further include one or more other components not pertinent to the proposed scheme of the present disclosure (e.g., internal power supply, display device and/or user interface device), and, thus, such component(s) of each of apparatus 310 and apparatus 320 are neither shown in FIG. 3 nor described below in the interest of simplicity and brevity.

In one aspect, each of processor 312 and processor 322 may be implemented in the form of one or more single-core processors, one or more multi-core processors, one or more RISC processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks pertaining to frequency-selective precoding for UL transmissions in mobile communications in accordance with various implementations of the present disclosure. In some implementations, each of processor 312 and processor 322 may include an electronic circuit with hardware components implementing one or more of the various proposed schemes in accordance with the present disclosure. Alternatively, other than hardware components, each of processor 312 and processor 322 may also utilize software codes and/or instructions in addition to hardware components to implement frequency-selective precoding for UL transmissions in mobile communications in accordance with various implementations of the present disclosure.

In some implementations, apparatus 310 may also include a transceiver 316 coupled to processor 312 and capable of wirelessly transmitting and receiving data, signals and information. In some implementations, transceiver 316 may be equipped with a plurality of antenna ports (not shown) such as, for example, four antenna ports. That is, transceiver 316 may be equipped with multiple transmit antennas and multiple receive antennas for MIMO wireless communications. In some implementations, apparatus 310 may further include a memory 314 coupled to processor 312 and capable of being accessed by processor 312 and storing data therein. In some implementations, apparatus 320 may also include a transceiver 326 coupled to processor 322 and capable of wirelessly transmitting and receiving data, signals and information. In some implementations, transceiver 326 may be equipped with a plurality of antenna ports (not shown) such as, for example, four antenna ports. That is, transceiver 326 may be equipped with multiple transmit antennas and multiple receive antennas for MIMO wireless communications. In some implementations, apparatus 320 may further include a memory 324 coupled to processor 322 and capable of being accessed by processor 322 and storing data therein. Accordingly, apparatus 310 and apparatus 320 may wirelessly communicate with each other via transceiver 316 and transceiver 326, respectively.

To aid better understanding, the following description of the operations, functionalities and capabilities of each of apparatus 310 and apparatus 320 is provided in the context of a mobile communication environment in which apparatus 310 is implemented in or as a UE (e.g., UE 110 in scenario 100) and apparatus 320 is implemented in or as a network node (e.g., network node 125 as a gNB or TRP) of a wireless network (e.g., network 120 as a 5G NR mobile network).

Under various proposed schemes in accordance with the present disclosure, with respect to codebook-based UL transmissions with frequency-selective precoding, processor 312 of apparatus 310 as a UE may receive, via transceiver 316, signaling from apparatus 320 as a network node of a wireless network. Additionally, processor 312 may perform, via transceiver 316, a codebook-based UL transmission to the network node with frequency-selective precoding in a subband or a plurality of subbands according to the signaling received from the network.

In some implementations, in receiving the signaling from apparatus 320, processor 312 may receive from apparatus 320 a subband TPMI containing information supporting the frequency-selective precoding for the UL transmission.

In some implementations, the subband TPMI may be indicated by a TPMI index differentially with respect to a wideband TPMI according to a mapping between TPMI indices and a plurality of precoders. Moreover, the subband TPMI may correspond to a respective precoder of the plurality of precoders for precoding the plurality of subbands.

In some implementations, in receiving the signaling from apparatus 320, processor 312 may receive, via transceiver 316, from apparatus 320 an indication of a mapping between TPMI indices and the plurality of precoders. The indication may include either of: (a) a permutation of a predefined mapping between the TPMI index and one of the plurality of precoders, or (b) a selection of one mapping from a plurality of predefined mappings between the TPMI index and one of the plurality of precoders.

In some implementations, the differential index used to indicate subband TPMI may be defined according to a mapping selected from a plurality of predefined mappings between TPMI indices and precoders, and the network may signal (e.g., via apparatus 320) which mapping is selected.

In some implementations, processor 312 may receive, via transceiver 316, from apparatus 320 an indication of a size of precoder bundling for the frequency-selective precoding in a frequency domain. In some implementations, in performing the codebook-based UL transmission, processor 312 may bundle a plurality of physical resource blocks (PRBs) into a plurality of PRB bundles each corresponding to a respective subband of the plurality of subbands. In some implementations, a number of PRBs in each of the PRB bundle may correspond to the size of precoder bundling.

Under various proposed schemes in accordance with the present disclosure, with respect to non-codebook-based UL transmissions with frequency-selective precoding, processor 312 of apparatus 310 as a UE may measure, via transceiver 316, a channel state information reference signal (CSI-RS) transmitted by apparatus 320 as a network node of a wireless network. Moreover, processor 312 may perform, via transceiver 316, a non-codebook-based UL transmission with a beamformed sounding reference signal (SRS) to apparatus 320 by performing a number of operations. For instance, processor 312 may determine a precoder based on a result of the measuring of the CSI-RS. Moreover, processor 312 may perform, via transceiver 316, frequency-selective precoding on the SRS using the precoder with a size of precoder bundling for the frequency-selective precoding in a frequency domain known by apparatus 320.

In some implementations, the size of the precoder bundling may define a number of contiguous PRBs in which signals are precoded using the same precoder.

In some implementations, the size of the precoder bundling may be predefined and known by both the network node and the UE.

In some implementations, processor 312 may perform additional operations. For instance, processor 312 may modify the size of the precoder bundling. Moreover, processor 312 may transmit, via transceiver 316, a report to apparatus 320 indicating a modification of the size of the precoder bundling.

In some implementations, processor 312 may receive, via transceiver 316, signaling from apparatus 320 indicating the size of the precoder bundling.

In some implementations, processor 312 may perform other operations. For instance, processor 312 may determine the size of the precoder bundling. Additionally, processor 312 may transmit, via transceiver 316, a report to apparatus 320 indicating the size of the precoder bundling.

Illustrative Processes

Figure 4:
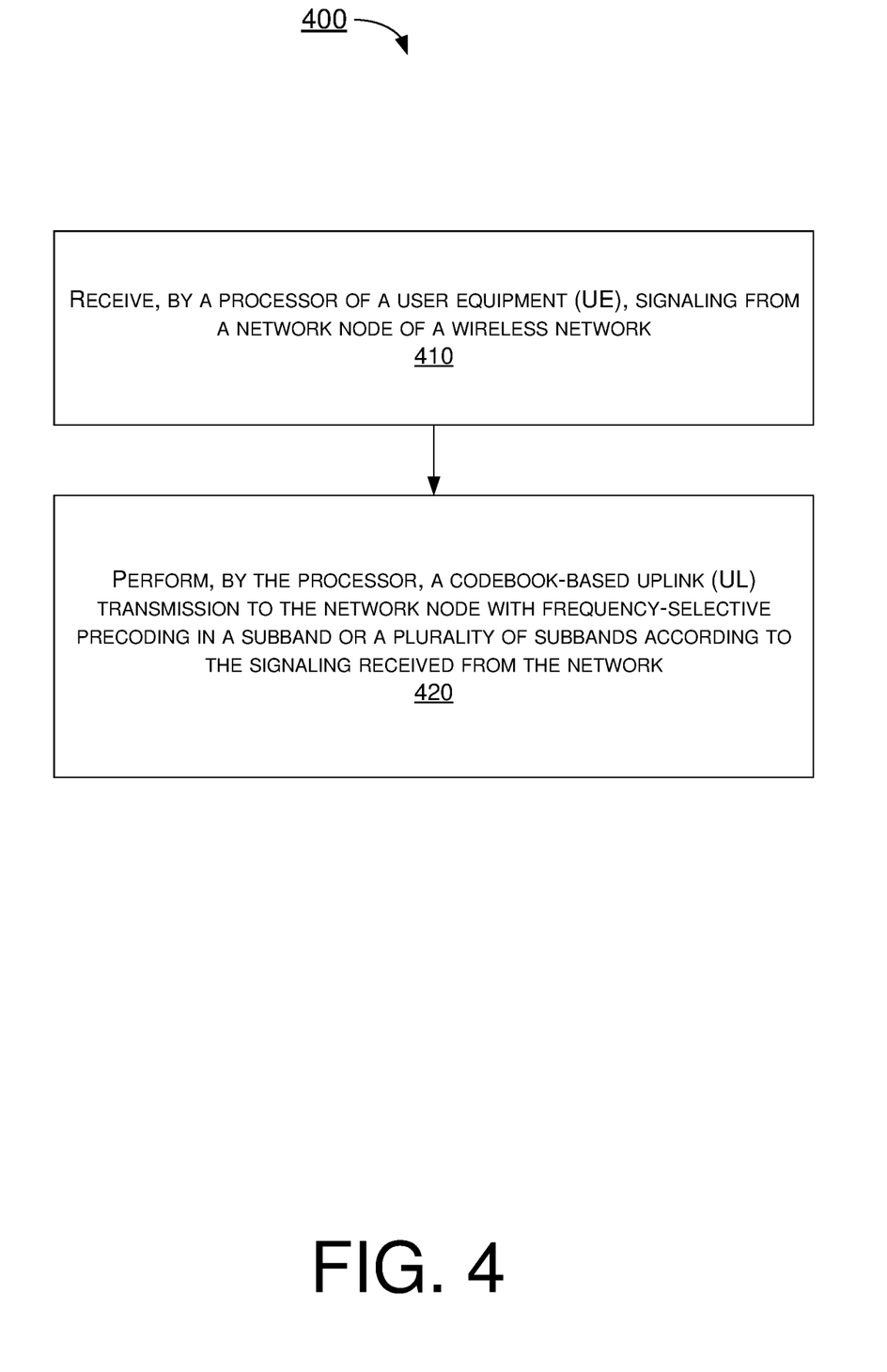
FIG. 4 is a flowchart of an example process in accordance with an implementation of the present disclosure.

FIG. 4 illustrates an example process 400 in accordance with an implementation of the present disclosure. Process 400 may be an example implementation of the various procedures, scenarios, schemes, solutions, concepts and techniques, or a combination thereof, whether partially or completely, with respect to frequency-selective precoding for UL transmissions in mobile communications in accordance with the present disclosure. Process 400 may represent an aspect of implementation of features of apparatus 310 and/or apparatus 320. Process 400 may include one or more operations, actions, or functions as illustrated by one or more of blocks 410 and 420. Although illustrated as discrete blocks, various blocks of process 400 may be divided into additional blocks, combined into fewer blocks, or eliminated, depending on the desired implementation.

Moreover, the blocks of process 400 may executed in the order shown in FIG. 4 or, alternatively, in a different order. Furthermore, one or more of the blocks of process 400 may be repeated one or more times. Process 400 may be implemented by apparatus 310 or any suitable UE or machine type devices. Solely for illustrative purposes and without limitation, process 400 is described below in the context of apparatus 310 as a UE and apparatus 320 as a network node (e.g., gNB or TRP) of a wireless network (e.g., 5G NR mobile network). Process 400 may begin at block 410.

At 410, process 400 may involve processor 312 of apparatus 310 as a UE receiving, via transceiver 316, signaling from apparatus 320 as a network node of a wireless network. Process 400 may proceed from 410 to 420.

At 420, process 400 may involve processor 312 performing, via transceiver 316, a codebook-based UL transmission to the network node with frequency-selective precoding in a subband or a plurality of subbands according to the signaling received from the network.

In some implementations, in receiving the signaling from apparatus 320, process 400 may involve processor 312 receiving from apparatus 320 a subband TPMI containing information supporting the frequency-selective precoding for the UL transmission.

In some implementations, the subband TPMI may be indicated by a TPMI index differentially with respect to a wideband TPMI according to a mapping between TPMI indices and a plurality of precoders. Moreover, the subband TPMI may correspond to a respective precoder of the plurality of precoders for precoding the plurality of subbands.

In some implementations, in receiving the signaling from apparatus 320, process 400 may involve processor 312 receiving from apparatus 320 an indication of a mapping between TPMI indices and a plurality of precoders. The indication may include either of: (a) a permutation of a predefined mapping between the TPMI index and one of the plurality of precoders, or (b) a selection of one mapping from a plurality of predefined mappings between the TPMI index and one of the plurality of precoders.

In some implementations, the subband TPMI may be indicated according to a mapping selected from a plurality of predefined mappings between TPMI indices and precoders.

In some implementations, process 400 may also involve processor 312 receiving, via transceiver 316, from apparatus 320 an indication of a size of precoder bundling for the frequency-selective precoding in a frequency domain. In some implementations, in performing the codebook-based UL transmission, process 400 may also involve processor 312 bundling a plurality of physical resource blocks (PRBs) into a plurality of PRB bundles each corresponding to a respective subband of the plurality of subbands. In some implementations, a number of PRBs in each of the PRB bundle may correspond to the size of precoder bundling.

Figure 5:
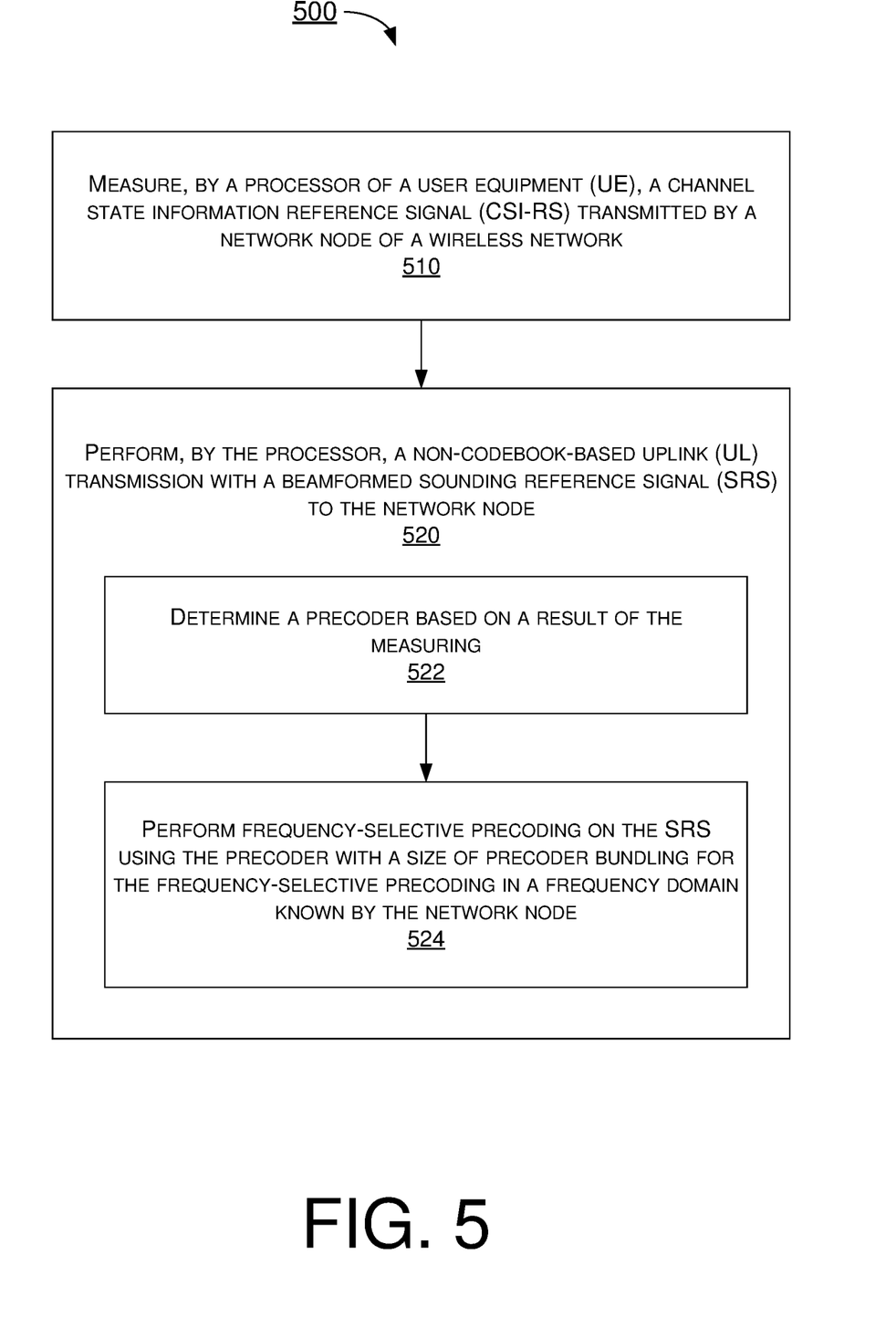
FIG. 5 is a flowchart of an example process in accordance with an implementation of the present disclosure.

FIG. 5 illustrates an example process 500 in accordance with an implementation of the present disclosure. Process 500 may be an example implementation of the various procedures, scenarios, schemes, solutions, concepts and techniques, or a combination thereof, whether partially or completely, with respect to frequency-selective precoding for UL transmissions in mobile communications in accordance with the present disclosure. Process 500 may represent an aspect of implementation of features of apparatus 310 and/or apparatus 320. Process 500 may include one or more operations, actions, or functions as illustrated by one or more of blocks 510 and 520 as well as sub-blocks 522 and 524. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Furthermore, one or more of the blocks of process 500 may be repeated one or more times. Process 500 may be implemented by apparatus 310 or any suitable UE or machine type devices. Solely for illustrative purposes and without limitation, process 500 is described below in the context of apparatus 310 as a UE and apparatus 320 as a network node (e.g., gNB or TRP) of a wireless network (e.g., 5G NR mobile network). Process 500 may begin at block 510.

At 510, process 500 may involve processor 312 of apparatus 310 as a UE measuring, via transceiver 316, a channel state information reference signal (CSI-RS) transmitted by apparatus 320 as a network node of a wireless network. Process 500 may proceed from 510 to 520.

At 520, process 500 may involve processor 312 performing, via transceiver 316, a non-codebook-based UL transmission with a beamformed sounding reference signal (SRS) to apparatus 320. The performing of the non-codebook-based UL transmission may be represented by 522 and 524.

At 522, process 500 may involve processor 312 determining a precoder based on a result of the measuring of the CSI-RS. Process 500 may proceed from 522 to 524.

At 524, process 500 may involve processor 312 performing, via transceiver 316, frequency-selective precoding on the SRS using the precoder with a size of precoder bundling for the frequency-selective precoding in a frequency domain known by apparatus 320.

In some implementations, the size of the precoder bundling may define a number of contiguous PRBs in which signals are precoded using the same precoder.

In some implementations, the size of the precoder bundling may be predefined and known by both the network node and the UE.

In some implementations, process 500 may involve processor 312 performing additional operations. For instance, process 500 may involve processor 312 modifying the size of the precoder bundling. Moreover, process 50 may involve processor 312 transmitting, via transceiver 316, a report to apparatus 320 indicating a modification of the size of the precoder bundling.

In some implementations, process 500 may involve processor 312 receiving, via transceiver 316, signaling from apparatus 320 indicating the size of the precoder bundling.

In some implementations, process 500 may involve processor 312 performing other operations. For instance, process 50 may involve processor 312 determining the size of the precoder bundling. Additionally, process 50 may involve processor 312 transmitting, via transceiver 316, a report to apparatus 320 indicating the size of the precoder bundling.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. An apparatus implementable in a user equipment (UE), comprising:
  a processor which, when in operation, performs a codebook-based uplink (UL) transmission or a non-codebook-based UL transmission to a network node of a wireless network with frequency-selective precoding,
  wherein a size of precoder bundling for the frequency-selective precoding in a frequency domain in the codebook-based UL transmission or the non-codebook-based UL transmission is known by the UE, and
  wherein the size of the precoder bundling defines a subband as a number of contiguous physical resource blocks (PRBs) precoded using a same precoder.

2. The apparatus of claim 1, wherein a subband transmission precoder matrix indication(TPMI) is indicated by a TPMI index differentially with respect to a wideband TPMI according to a mapping between TPMI indices and a plurality of precoders, wherein the subband TPMI corresponds to a respective precoder of the plurality of precoders for precoding in a subband or in a plurality of subbands, wherein, in performing the codebook-based UL transmission, the processor further receives signaling from the network node an indication of the mapping between TPMI indices and the plurality of precoders, and wherein the indication comprises a permutation of a predefined mapping between the TPMI index and one of the plurality of precoders or a selection of one mapping from a plurality of predefined mappings between the TPMI index and one of the plurality of precoders.

3. The apparatus of claim 1, wherein, in performing the codebook-based UL transmission, the processor further performs:
  receiving from the network node an indication of the size of the precoder bundling,
  wherein, in performing the codebook-based UL transmission, the processor bundles the PRBs into a plurality of PRB bundles each corresponding to a respective subband of one subband or a plurality of subbands, and wherein a number of PRBs in each of the PRB bundles corresponds to the size of the precoder bundling.

4. The apparatus of claim 1, wherein, in performing the non-codebook-based UL transmission, the processor further performs:
  measuring a channel state information reference signal (CSI-RS) transmitted by the network node; and
  performing the non-codebook-based UL transmission with a beamformed sounding reference signal (SRS) to the network node by:
  determining a precoder based on a result of the measuring; and
  performing frequency-selective precoding on the SRS using the precoder.

5. The apparatus of claim 1, wherein the size of the precoder bundling is predefined or signaled to the UE from the network node.

6. The apparatus of claim 1, wherein, in performing the non-codebook-based UL transmission, the processor further performs:
   modifying the size of the precoder bundling; and
   transmitting a report to the network node indicating a modification of the size of the precoder bundling.

7. The apparatus of claim 1, wherein, in performing the non-codebook-based UL transmission, the processor further performs:
   determining the size of the precoder bundling; and
   transmitting a report to the network node indicating the size of the precoder bundling.

8. The apparatus of claim 1, wherein, in performing the codebook-based UL transmission, the processor performs:
   receiving a subband transmission precoder matrix indication (TPMI) containing information supporting the frequency-selective precoding for the codebook-based UL transmission; and
   performing the codebook-based UL transmission to the network node with the frequency-selective precoding in one subband or a plurality of subbands according to the subband TPMI.

9. A method, comprising:
   performing, by a processor of a user equipment (UE), a codebook-based uplink (UL) transmission or a non-codebook-based UL transmission to a network node of a wireless network with frequency-selective precoding;
   wherein a size of precoder bundling for the frequency-selective precoding in a frequency domain in the codebook-based UL transmission or the non-codebook-based UL transmission is known by the UE, and
   wherein the size of the precoder bundling defines a subband as a number of contiguous physical resource blocks (PRBs) precoded using a same precoder.

10. The method of claim 9, wherein a subband transmission precoder matrix indication (TPMI) is indicated by a TPMI index differentially with respect to a wideband TPMI according to a mapping between TPMI indices and a plurality of precoders, wherein the subband TPMI corresponds to a respective precoder of the plurality of precoders for precoding in a subband or in a plurality of subbands, wherein the performing of the codebook-based UL transmission further comprises receiving signaling from the network node an indication of the mapping between TPMI indices and the plurality of precoders, and wherein the indication comprises a permutation of a predefined mapping between the TPMI index and one of the plurality of precoders or a selection of one mapping from a plurality of predefined mappings between the TPMI index and one of the plurality of precoders.

11. The method of claim 9, wherein the performing of the codebook- based UL transmission further comprises:
   receiving from the network node an indication of the size of the precoder bundling,
   wherein the performing of the codebook-based UL transmission comprises bundling the PRBs into a plurality of PRB bundles each corresponding to a respective subband of one subband or a plurality of subbands, and
   wherein a number of PRBs in each of the PRB bundles corresponds to the size of the precoder bundling.

12. The method of claim 9, wherein the performing of the non-codebook- based UL transmission further comprises:
   measuring a channel state information reference signal (CSI-RS) transmitted by the network node; and
   performing the non-codebook-based UL transmission with a beamformed sounding reference signal (SRS) to the network node by:
      determining a precoder based on a result of the measuring; and
      performing frequency-selective precoding on the SRS using the precoder.

13. The method of claim 12, wherein the size of the precoder bundling is predefined or signaled to the UE from the network node.

14. The method of claim 13, wherein the performing of the non-codebook- based UL transmission further comprises:
   modifying the size of the precoder bundling; and
   transmitting a report to the network node indicating a modification of the size of the precoder bundling.

15. The method of claim 12, wherein the performing of the non-codebook- based UL transmission further comprises:
   determining the size of the precoder bundling; and
   transmitting a report to the network node indicating the size of the precoder bundling.

16. The method of claim 9, wherein the performing of the codebook- based UL transmission comprises:
   receiving a subband transmission precoder matrix indication (TPMI) containing information supporting the frequency-selective precoding for the codebook-based UL transmission; and
   performing the codebook-based UL transmission to the network node with the frequency-selective precoding in one subband or a plurality of subbands according to the subband TPMI.

* * * * *